United States Patent
Kim

(10) Patent No.: US 12,552,312 B2
(45) Date of Patent: Feb. 17, 2026

(54) LIGHTING DEVICE FOR MOVING BODY AND METHOD THEREFOR

(71) Applicant: HYUNDAI MOBIS CO., LTD., Seoul (KR)

(72) Inventor: Myeong Je Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 41 days.

(21) Appl. No.: 18/586,744

(22) Filed: Feb. 26, 2024

(65) Prior Publication Data

US 2025/0018859 A1    Jan. 16, 2025

(30) Foreign Application Priority Data

Jul. 11, 2023 (KR) .................. 10-2023-0089807

(51) Int. Cl.
*B60Q 1/50* (2006.01)
*B60Q 1/24* (2006.01)

(52) U.S. Cl.
CPC ........... *B60Q 1/5037* (2022.05); *B60Q 1/247* (2022.05); *B60Q 1/507* (2022.05)

(58) Field of Classification Search
CPC ....... B60Q 1/5037; B60Q 1/247; B60Q 1/507
See application file for complete search history.

(56) References Cited

U.S. PATENT DOCUMENTS

| | | | | |
|---|---|---|---|---|
| 10,814,778 | B2* | 10/2020 | Lee ..................... | B60Q 1/2607 |
| 2018/0180247 | A1* | 6/2018 | Park ..................... | F21S 41/285 |
| 2018/0319328 | A1* | 11/2018 | Takae .................. | B60Q 1/2607 |
| 2019/0007626 | A1* | 1/2019 | Kirsch ................. | B60K 35/415 |
| 2019/0054851 | A1* | 2/2019 | Kim ..................... | F21S 41/16 |
| 2019/0270405 | A1* | 9/2019 | Fukumoto ............. | B60Q 1/507 |
| 2021/0171065 | A1* | 6/2021 | Mimura ................ | B60Q 1/507 |
| 2021/0347295 | A1* | 11/2021 | Ahn ..................... | B60Q 1/547 |
| 2023/0219484 | A1* | 7/2023 | Hanchett ............. | B60Q 1/0035 340/468 |

* cited by examiner

*Primary Examiner* — Mohamed Barakat
(74) *Attorney, Agent, or Firm* — NSIP Law

(57) ABSTRACT

A lighting device for a moving body and a method therefor are provided. The lighting device includes a sensor that senses objects located in at least one direction of the moving body and outputs object information related to the sensed objects, a light output device including a lamp, and a controller to control the light output device based on the object information, and control the light output device such that, based on information on a location of an object included in the object information, the lamp emits light along a movement path of the object.

14 Claims, 8 Drawing Sheets

LIGHTING DEVICE FOR MOVING BODY AND METHOD THEREFOR

CROSS-REFERENCE TO RELATED APPLICATION(S)

This application claims priority under 35 U.S.C. § 119 to Korean Patent Application No. 10-2023-0089807, filed on Jul. 11, 2023, in the Korean Intellectual Property Office, the disclosure of which is incorporated herein by reference in its entirety for all purposes.

BACKGROUND

1. Field

The following disclosure relates to a lighting device for a moving body, and more particularly, to a lighting device that senses an object around a moving body and controls lighting to follow the object.

2. Description of Related Art

Autonomous vehicles include vehicle terminals corresponding to autonomous driving devices built into various driving means to perform autonomous driving through driving position detection. These autonomous driving devices are mainly applied to ships and airplanes, but have recently been applied to vehicles driving on roads, for example, to inform users of various information such as driving paths and road congestion degrees through monitors, or to drive vehicles autonomously or control driving conditions.

In a case where the autonomous vehicle is a moving body that moves at a high speed, the autonomous vehicle needs to recognize driving environments (for example, by recognizing a front vehicle and detecting an obstacle) in real time to inform a driver of the driving environments, or determine driving environments in real time to perform emergency functions corresponding to the driving environments, respectively, by itself. To this end, a lot of data may be processed in real time.

However, the data acquired by the autonomous vehicle is delivered to the user of the autonomous vehicle, or used by the autonomous vehicle to control itself. A pedestrian crossing a road has no way of confirming whether the autonomous vehicle recognizes him/her and is properly controlled according to road environments when the autonomous vehicle is actually driving. Therefore, there is a need for a means of communication between the autonomous vehicle and the pedestrian on the road for the pedestrian.

SUMMARY

An embodiment of the present invention is directed to delivering a message to an object located around a moving body by outputting object information sensed by the moving body through light emission from the moving body for communication between the moving body and the object.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a lighting device for a moving body includes: a sensor that senses one or more objects located in at least one direction of the moving body and outputs object information related to the sensed one or more objects; a light output device including at least one lamp; and a controller configured to: control the light output device based on the object information; and control the light output device such that, based on information on a location of an object included in the object information, the at least one lamp emits light along a movement path of the object.

The controller may be further configured to control the light output device such that the number of objects included in the object information is displayed by the lamp.

The controller may be further configured to control the light output device such that one or more first marks representing the one or more objects are displayed as the number of objects on the light output device.

The controller may be further configured to control the light output device such that a numeral corresponding to the number of objects is displayed on the light output device.

The controller may be further configured to control the light output device such that the lighting device is oriented to an area where a density of the one or more objects is highest within a region sensed by the sensor.

The controller may be further configured to store the object information; learn features of the one or more objects; and control the light output device such that second marks representing features of the one or more objects are displayed through learned data.

The controller may be further configured to set safety priorities according to the features of the one or more objects, and control the light output device such that the at least one lamp emits light along a movement path of an object among the one or more objects having a highest priority according to safety priorities.

Each of the second marks may include at least one of a physical feature of the object, a feature of clothes worn by the object, a feature of whether an animal is accompanied, or any combination thereof.

The controller may be further configured to control the light output device such that a pupil image is displayed on the light output device, and the pupil image is moved according to the location of the object.

The lamp of the light output device may comprise a display.

The lamp may include a light bulb display, a light-emitting diode (LED) display, an organic light-emitting diode (OLED) display, quantum dot LED (QLED) display, or any combination thereof.

The light output device may be disposed outside the moving body, and the controller may be further configured to control the light output device to display an image that is externally visible.

In another general aspect of the disclosure, a method of controlling a lighting device of a moving body includes: sensing, by a sensor, one or more objects located in at least one direction of the moving body and outputting object information related to the sensed one or more objects; controlling the light output device based on the object information; and controlling the light output device such that, based on information on a location of an object included in the object information, the light output device emits light along a movement path of the object.

The method may further include controlling the light output device such that a number of objects included in the object information is displayed.

The method may further include controlling the light output device such that the lighting device is oriented to an area where a density of the one or more objects is highest within a region sensed by the sensor.

The method may further include storing the object information; learning features of the one or more objects, and controlling the light output device such that second marks representing features of the one or more objects are displayed through learned data.

DETAILED DESCRIPTION

Figure 1:
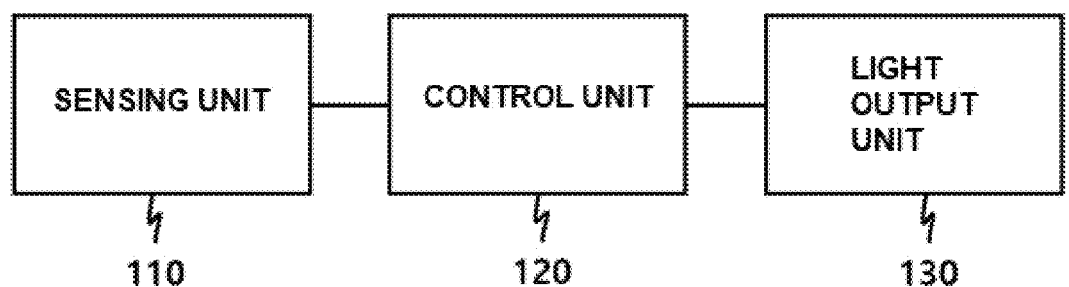
FIG. 1 is a diagram illustrating a configuration of a lighting device for a moving body according to an embodiment of the present invention.

The aforementioned objects, features, and advantages of the present invention will be more apparent from the embodiments to be described below with reference to the accompanying drawings. The following specific structural or functional descriptions are provided merely for the purpose of describing embodiments according to the concept of the present invention, and the embodiments according to the concept of the present invention can be implemented in various forms and should not be construed as being limited to the embodiments set forth herein. Since various modifications may be made to the embodiments according to the concept of the present invention, and the embodiments of the present invention may have various forms, specific embodiments will be illustrated in the drawings and described in detail hereinbelow. However, this is not intended to limit the embodiments according to the concept of the present invention to specific forms disclosed herein, and it should be noted that the specific embodiments described herein cover all modifications, equivalents, or substitutes within the spirit and technical scope of the present invention. Terms "first", "second", and/or the like may be used to describe various components but the components are not limited by the above terms. The above terms are only used to distinguish one component from another component. For example, a first component may be referred to as a second component, and similarly, a second component may be referred to as a first component, without departing from the scope according to the concept of the present disclosure. It should be noted that, when one component is referred to as being coupled or connected to another component, they may be directly coupled or connected to each other, or they may be coupled or connected to each other through an intervening component therebetween. On the other hand, when one component is referred to as being directly coupled to or directly connected to another component, there is no intervening component therebetween. Other expressions for describing relationships between components, that is, expressions such as "between", "immediately between", "adjacent to", and "directly adjacent to" shall be construed similarly. Terms used herein are used only to describe the specific embodiments and are not intended to limit the present invention. Singular expressions include plural expressions unless the context clearly indicates otherwise. It should be noted that terms "include", "have", and the like used herein are intended to specify the presence of stated features, numbers, steps, operations, components, parts, or combinations thereof but do not preclude the presence or addition of one or more other features, numbers, steps, operations, components, parts, or combinations thereof. Unless otherwise defined, all terms used herein, including technical or scientific terms, have the same meanings as those generally understood by those skilled in the art to which the present invention pertains. The terms defined in generally used dictionaries and the like should be interpreted as having the same meanings as those in the context of the related art, and should not be interpreted as having ideal or excessively formal meanings unless clearly defined herein. Hereinafter, the present invention will be described in detail by describing preferred embodiments of the present invention with reference to the accompanying drawings. Like reference signs in the drawings indicate like elements.

FIG. 1 is a diagram illustrating a configuration of a lighting device for a moving body according to an embodiment of the present invention. Referring to FIG. 1, a lighting device for a moving body may include a sensing unit 110 (e.g., one or more sensors), a control unit 120 (e.g., a controller that may include one or more processors), and a light output unit 130 (e.g., a light output device). The moving body may include a vehicle, a ship, an airplane, or the like, and may include any type of moving body equipped with an autonomous driving system.

The sensing unit 110 includes an advanced driver assistance system (ADAS) sensor for autonomously driving the moving body, and may include a variety of sensors for sensing objects, such as light detection and ranging (LiDAR), radar, and cameras. In addition, the sensing unit 110 may sense objects omnidirectionally around the moving body, and may sense all objects within a preset region. When sensing the objects, the sensing unit 110 may output object information to the control unit 120.

When receiving the object information from the sensing unit 110, the control unit 120 may control the light output unit 130 based on the object information. For example, when an object crossing a crosswalk is sensed, the control unit 120 may control lamps included in the light output unit 130 to emit light along the object according to a moving direction of the object.

In addition, the control unit 120 may control the light output unit 130 so that the number of objects included in the object information received from the sensing unit 110 is displayed by the lamp.

In addition, the control unit 120 may control the light output unit 130 so that as many first marks representing objects are displayed as the number of objects on the light output unit 130. For example, the first mark may be an image representing a pedestrian, and if the number of pedestrians sensed by the sensing unit 110 is 5, five first marks may be displayed on the light output unit 130.

In addition, the control unit 120 may control the light output unit 130 so that a numeral corresponding to the number of objects is displayed on the light output unit 130. For example, if the number of objects (pedestrians) sensed by the sensing unit 110 is 10, the control unit 120 may control the light output unit 130 so that the numeral "10" is displayed on the light output unit 130.

In addition, when a plurality of objects are sensed, the control unit 120 may control the light output unit 130 so that the lamp emits light to an area where a density of objects is highest within a sensing region.

In addition, the control unit 120 may store the object information, learn a feature of an object, and control the light output unit 130 to display a second mark representing the feature of the object through learned data. The feature of the object may include a physical feature of the object, a feature of clothes worn by the object, whether an animal is accompanied, whether there is a means of transportation, etc., and the second mark may be a schematic image thereof. For example, the control unit 120 may learn a feature of an elderly or weak person whenever an elderly or weak person is sensed, and determine whether a sensed object is an elderly or weak person. When it is determined that the object is an elderly or weak person, the control unit 120 may control the light output unit 130 to display an image (second mark) representing the elderly or weak person.

In addition, the control unit 120 may set a safety priority according to the feature of the object, and control the light output unit 130 so that the lamp emits light along a movement path of the object of which the priority is highest according to the safety priority. For example, in a case where the sensed object is an elderly or weak person, the control unit 120 may place the elderly or weak person as a high safety priority, and control the light output unit 130 so that the lamp emits light along a movement path of the elderly or weak person.

In addition, the control unit 120 may control the light output unit 130 to display a pupil image on the light output unit 130, and control the light output unit 130 to move the pupil image according to a position of the object so that the object can see whether the moving body is sensing the object.

The light output unit 130 may include at least one lamp (not illustrated). The lamp (not illustrated) may include, for example, a light-emitting diode (LED), a light bulb, an organic light-emitting diode (OLED), or another display device (e.g., a quantum dot LED (QLED)). The light output unit 130 may be disposed outside the moving body to brighten up or output an image or the like according to the control of the control unit 120.

Figure 2:
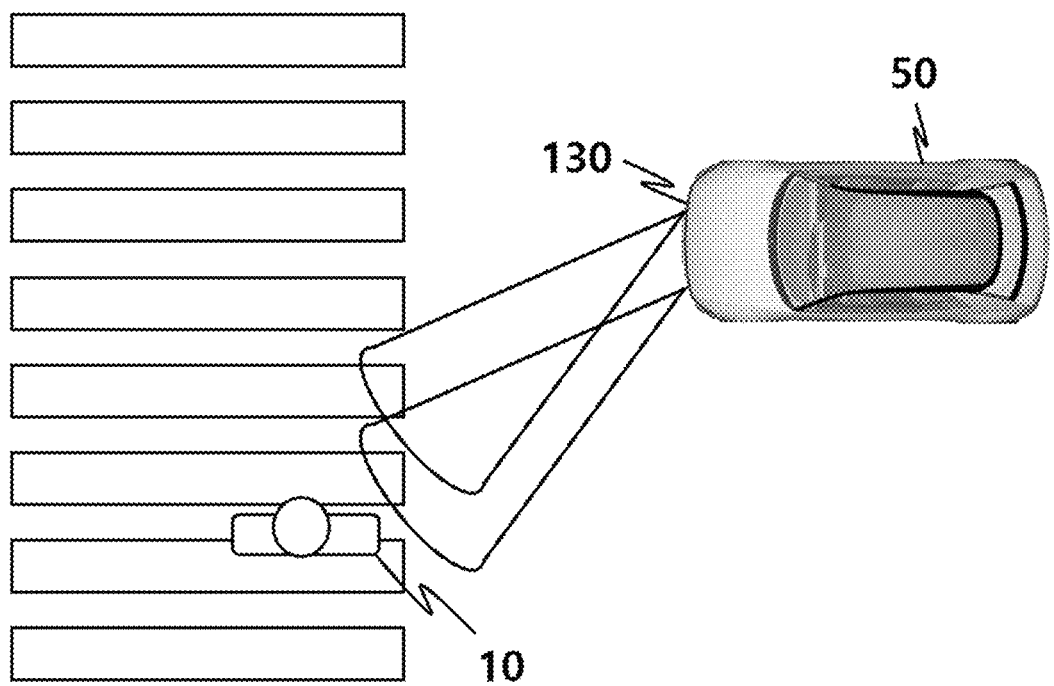
FIG. 2 is a diagram illustrating an example in which a lighting device for a moving body according to an embodiment of the present invention emits light when sensing an object.

FIG. 2 is a diagram illustrating an example in which a lighting device for a moving body according to an embodiment of the present invention emits light when sensing an object.

Referring to FIGS. 1 and 2, the light output unit 130 of the lighting device for the moving body 50 may be controlled by the control unit 120 so that the lamp emits light according to a moving direction of an object 10 when the object 10 is sensed.

The control unit 120 may control the light output unit 130 so that, when an object 10 is sensed by the sensing unit 110, the lamp emits light to the object 10, and furthermore, control the light output unit 130 so that, when a plurality of objects 10 are sensed, the lamp emits light to an object 10 sensed with a lower priority according to the order in which the objects 10 are sensed. In addition, the control unit 120 may learn features of objects 10, set safety priorities according to the learned features of the objects 10, and control the light output unit 130 so that an light emitting unit emits light along a movement path of an object 10 having a highest priority according to the safety priorities. At this time, the priorities according to the safety priorities set by the control unit 120 may be applied before the order in which the objects 10 are sensed by the sensing unit 110.

The lamp with which the light output unit 130 emits light to the object 10 may include a headlight and/or a taillight of the moving body 50. In addition, the light output unit 130 may emit light according to a movement of the object 10 using a lamp formed of a plurality of LEDs. In addition, the light output unit 130 may display a pupil image and move the pupil image according to a moving direction of the object 10.

Figure 3:
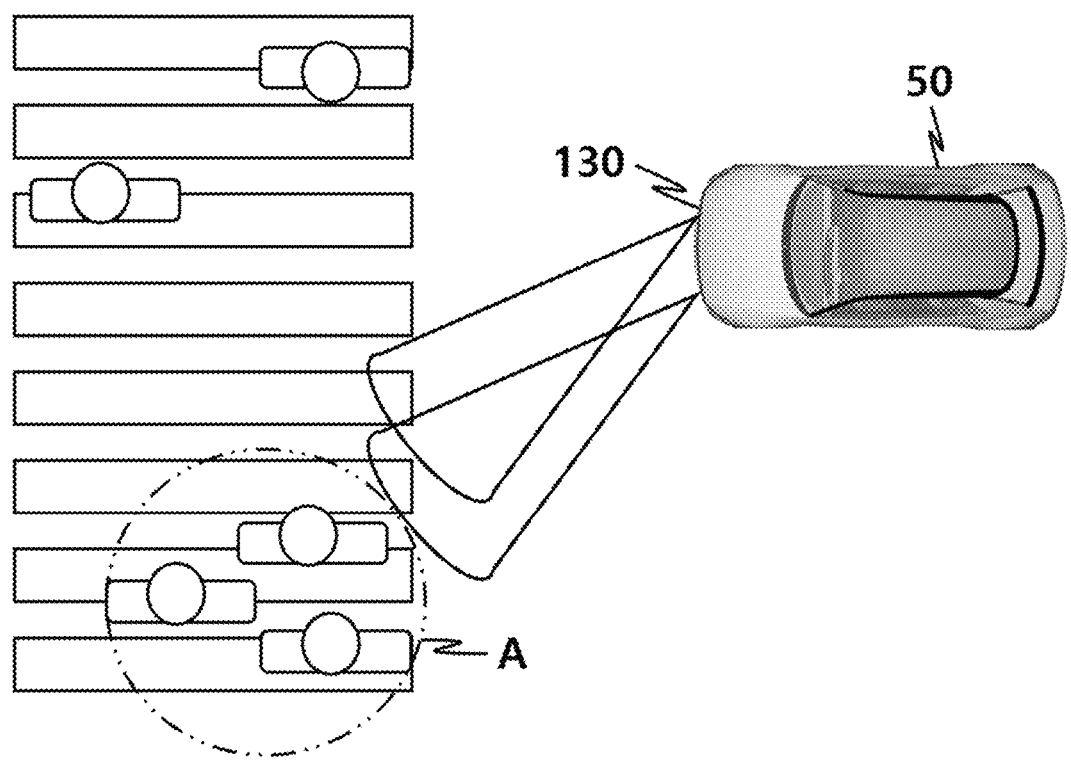
FIG. 3 is a diagram illustrating an example in which a lighting device for a moving body according to an embodiment of the present invention emits light when sensing a plurality of objects.

FIG. 3 is a diagram illustrating an example in which a lighting device for a moving body according to an embodiment of the present invention emits light when sensing a plurality of objects.

Referring to FIGS. 1 and 3, the light output unit 130 of the lighting device for the moving body 50 may be controlled by the control unit 120 so that, when a plurality of objects 10 are sensed, the lamp emits light to an area A where a density of objects 10 is highest within a sensing region.

When a plurality of objects 10 are sensed from the sensing unit 110 for a certain period of time, the control unit 120 may determine a density of the objects 10 in the sensing region. The control unit 120 may determine an area A with the highest density of objects 10 in the sensing region of the sensing unit 110, and control the light output unit 130 so that the lamp emits light to the area A.

In addition, when a plurality of objects 10 are sensed from the sensing unit 110 within a short period of time, the control unit 120 may determine a density of objects 10 in the sensing region.

The lamp with which the light output unit 130 emits light to the area A with the high density of objects may include a headlight and/or a taillight of the moving body 50. In addition, the light output unit 130 may emit light according to a movement of the area A using a lamp formed of a plurality of LEDs.

Figure 4:
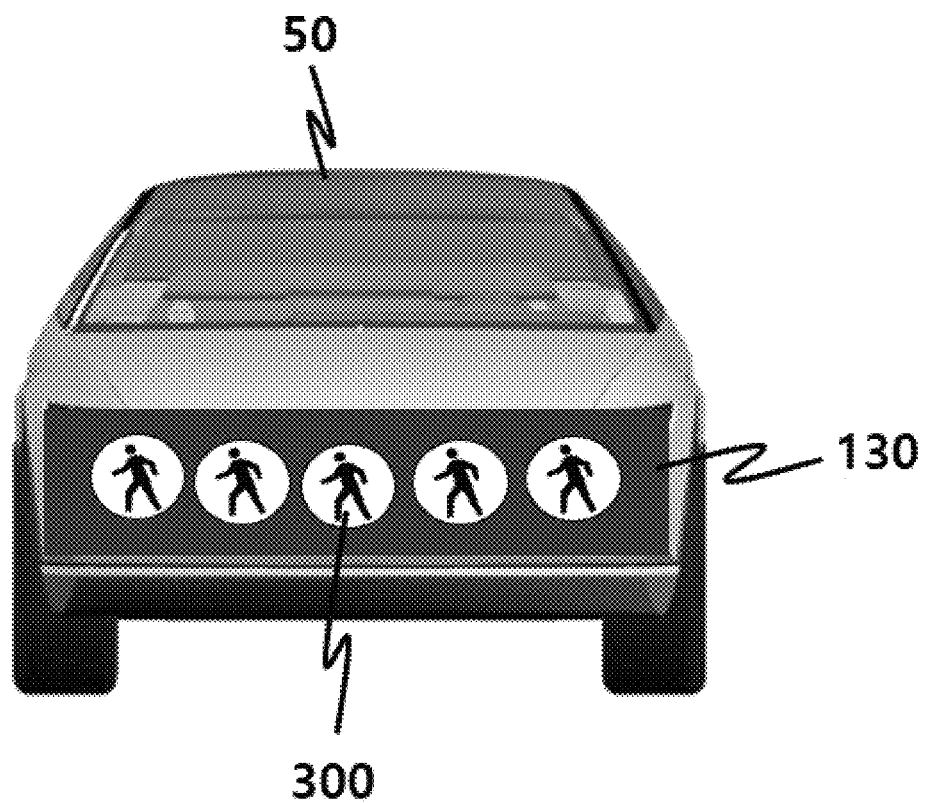
FIG. 4 is a diagram illustrating an example in which a lighting device for a moving body according to an embodiment of the present invention displays first marks according to the number of objects.

FIG. 4 is a diagram illustrating an example in which a lighting device for a moving body according to an embodiment of the present invention displays first marks according to the number of objects.

Referring to FIGS. 1 and 4, the light output unit 130 of the lighting device for the moving body 50 may be controlled by the control unit 120 so that, when objects 10 are sensed, as many first marks 300 are displayed as the number of objects 10 using the lamp.

The control unit 120 may control the light output unit 130 so that as many first marks 300 representing objects are displayed as the number of objects on the light output unit 130. For example, the first mark 300 may be an image representing a pedestrian, and if the number of pedestrians sensed by the sensing unit 110 is 5, five first marks 300 may be displayed on the light output unit 130.

The light output unit 130 may display a plurality of first marks 300 using a lamp formed of a plurality of LEDs. In addition, the light output unit 130 may display a plurality of first marks 300 using a lamp formed of a display device such as an OLED.

Figure 5:
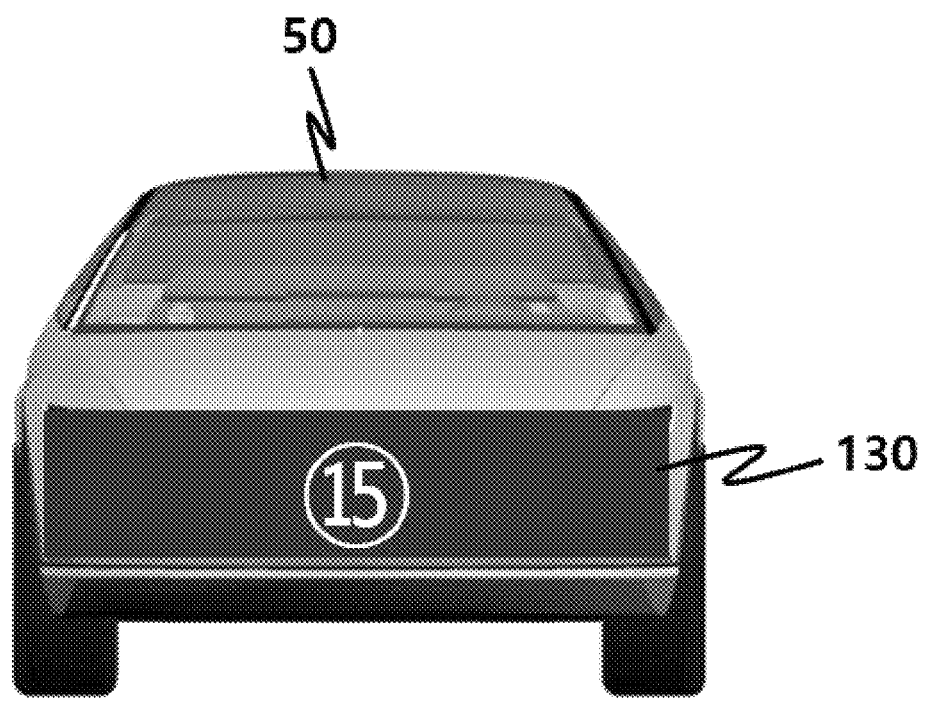
FIG. 5 is a diagram illustrating an example in which a lighting device for a moving body according to an embodiment of the present invention displays a numeral according to the number of objects.

FIG. 5 is a diagram illustrating an example in which a lighting device for a moving body according to an embodiment of the present invention displays a numeral according to the number of objects.

Referring to FIGS. 1 and 5, the light output unit 130 of the lighting device for the moving body 50 may be controlled by the control unit 120 so that, when objects 10 are sensed, a numeral corresponding to the number of objects 10 is displayed using the lamp.

The control unit 120 may control the light output unit 130 so that a numeral corresponding to the number of objects is displayed on the light output unit 130. For example, if the number of objects (pedestrians) sensed by the sensing unit 110 is 15, the control unit 120 may control the light output unit 130 so that the numeral "15" is displayed on the light output unit 130.

The light output unit 130 may display a numeral using a lamp formed of a plurality of LEDs, or display a numeral using a lamp formed of a display device such as an OLED.

Figure 6:
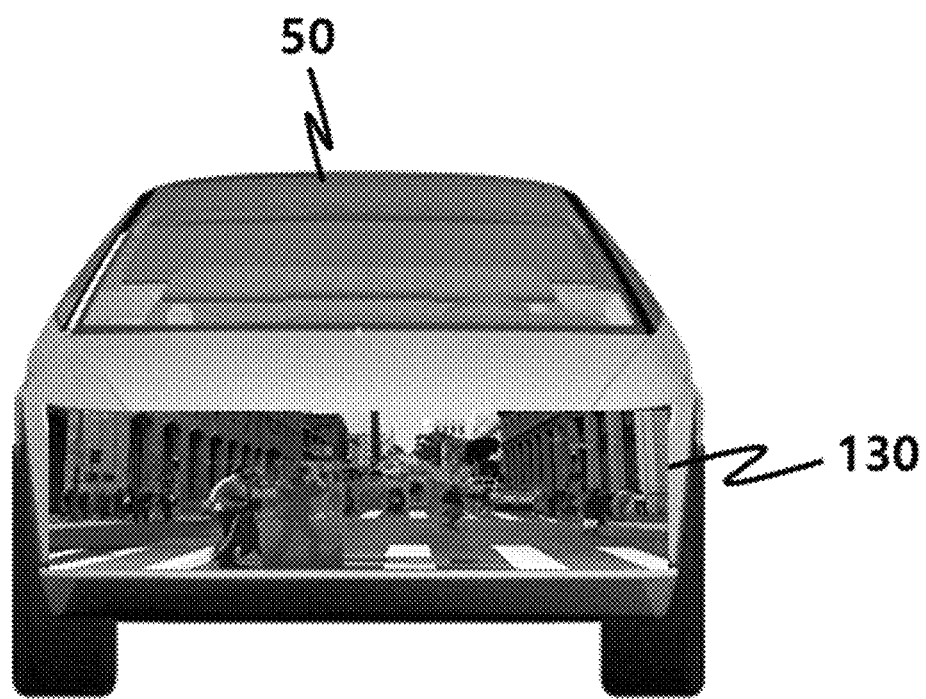
FIG. 6 is a diagram illustrating an example in which a lighting device for a moving body according to an embodiment of the present invention outputs image data acquired by a sensing unit to a light output unit.

FIG. 6 is a diagram illustrating an example in which a lighting device for a moving body according to an embodiment of the present invention outputs image data acquired by a sensing unit to a light output unit.

Referring to FIGS. 1 and 6, the light output unit 130 of the lighting device for the moving body 50 may output image data acquired by the sensing unit 110 as it is through the lamp.

The sensing unit 110 includes an advanced driver assistance system (ADAS) sensor for autonomously driving the moving body, and may include a variety of sensors for sensing objects, such as light detection and ranging (LiDAR), radar, and cameras.

Here, the control unit 120 may control the light output unit 130 so that image data acquired by the camera included in the sensing unit 110 is output as it is by the light output unit 130.

Accordingly, the object 10 can see whether the moving body 50 is sensing itself through real-time image data output from the light output unit 130.

Figure 7:
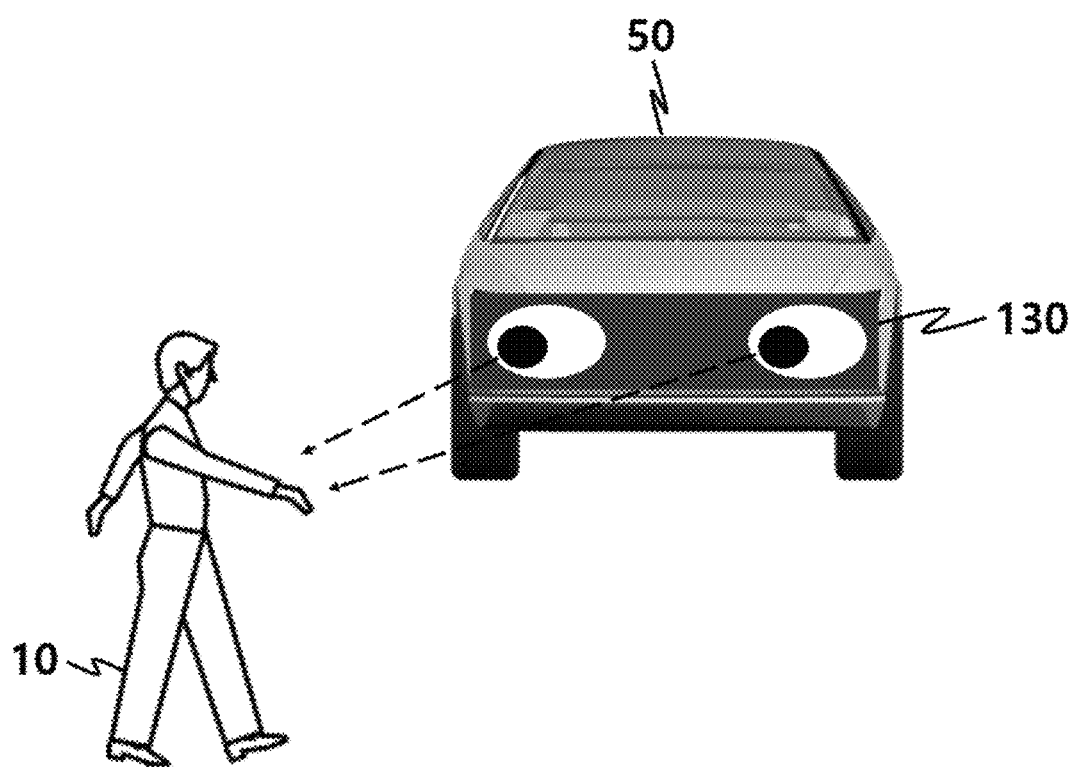
FIG. 7 is a diagram illustrating an example in which a light output unit of a lighting device for a moving body according to an embodiment of the present invention displays a pupil image.

FIG. 7 is a diagram illustrating an example in which a light output unit of a lighting device for a moving body according to an embodiment of the present invention displays a pupil image.

Referring to FIGS. 1 and 7, the light output unit 130 of the lighting device for the moving body 50 may be controlled by the control unit 120 to display a pupil image, and move the pupil image according to a moving direction of an object 10 when the object 10 is sensed by the sensing unit 110.

Accordingly, the object 10 can see whether the moving body 50 is sensing itself as the pupil image output from the light output unit 130 is emitted along itself.

Figure 8:
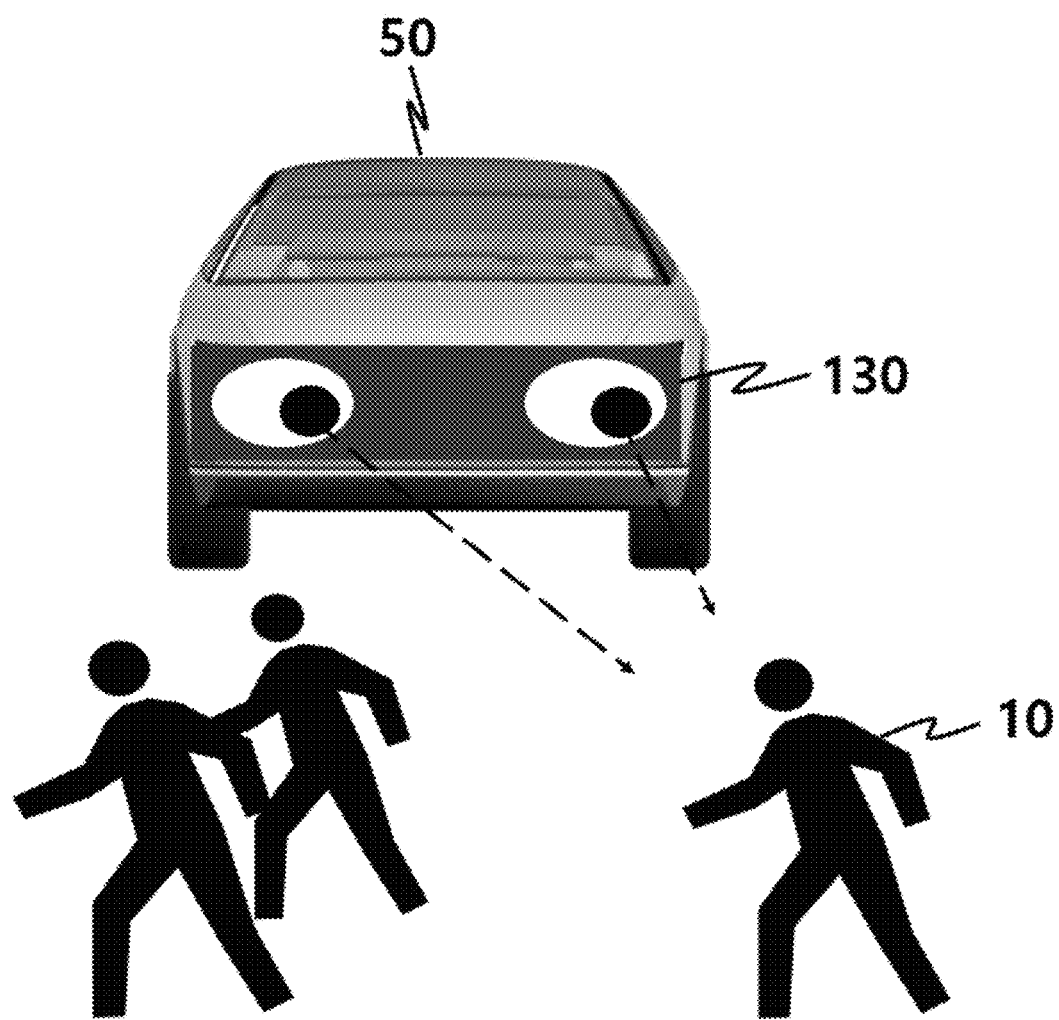
FIG. 8 is a diagram illustrating an example in which a light output unit of a lighting device for a moving body according to an embodiment of the present invention emits light according to priorities of objects.

FIG. 8 is a diagram illustrating an example in which a light output unit of a lighting device for a moving body according to an embodiment of the present invention emits light according to priorities of objects.

Referring to FIGS. 1 and 8, the light output unit 130 of the lighting device for the moving body 50 may be controlled by the control unit 120 to display a pupil image, and move the pupil image according to a moving direction of an object 10 when the object 10 is sensed by the sensing unit 110. In addition, the light output unit 130 may be controlled by the control unit 120 so that the pupil image is emitted according to the priorities of the objects 10.

The control unit 120 may control the light output unit 130 so that, when an object 10 is sensed by the sensing unit 110, a pupil image is emitted to the object 10 using the lamp, and furthermore, control the light output unit 130 so that, when a plurality of objects 10 are sensed, a pupil image is emitted to an object 10 sensed with a lower priority according to the order in which the objects 10 are sensed.

The control unit 120 may set safety priorities according to features of objects, and control the light output unit 130 so that a pupil image is emitted along a movement path of an object having a highest priority according to the safety priorities. For example, when the sensed object is an elderly or weak person, the control unit 120 may place the elderly or weak person as a high safety priority, and control the light output unit 130 so that a pupil image is emitted along a movement path of the elderly or weak person. At this time, the priorities according to the safety priorities set by the control unit 120 may be applied before the order in which the objects 10 are sensed by the sensing unit 110.

Although the preferred embodiments of the present invention have been described above, the embodiments disclosed herein are not intended to limit the technical idea of the present invention, but are provided to explain the technical idea of the present invention. Therefore, the technical idea of the present invention includes not only each of the embodiments disclosed herein but also a combination of the embodiments disclosed here, and furthermore, the scope of the technical idea of the present invention is not limited by these embodiments. In addition, those skilled in the art to which the present invention pertains may make various changes and modifications to the present invention without departing from the spirit and scope of the appended claims, and all of such appropriate changes and modifications shall be regarded as falling within the scope of the present invention as equivalents.

What is claimed is:

1. A lighting device for a moving body, the lighting device comprising:
 a sensor that senses one or more objects located in at least one direction of the moving body and outputs object information related to the sensed one or more objects;
 a light output device including at least one lamp; and
 a controller configured to:
  control the light output device based on the object information; and
  control the light output device such that, based on information on a location of an object, among the one or more objects, included in the object information, the at least one lamp emits light along a movement path of the object; and
  control the light output device such that a number of objects included in the object information is displayed by the lamp,
 wherein the light output device displays an image corresponding to the object.

2. The lighting device of claim 1, wherein the controller is further configured to control the light output device such that one or more first marks representing the one or more objects are displayed as the number of objects on the light output device.

3. The lighting device of claim 1, wherein the controller is further configured to control the light output device such that a numeral corresponding to the number of objects is displayed on the light output device.

4. The lighting device of claim 1, wherein the controller is further configured to control the light output device such that the lighting device is oriented to an area where a density of the one or more objects is highest within a region sensed by the sensor.

5. The lighting device of claim 1, wherein the controller is further configured to control the light output device such that a pupil image is displayed on the light output device, and the pupil image is moved according to the location of the object.

6. The lighting device of claim 1, wherein the at least one lamp comprises a display device.

7. The lighting device of claim 6, wherein the at least one lamp comprises a light bulb display, a light-emitting diode (LED) display, an organic light-emitting diode (OLED) display, quantum dot LED (QLED) display, or any combination thereof.

8. The lighting device of claim 6,
wherein the light output device is disposed outside the moving body, and
wherein the controller is further configured to control the light output device to display an image that is externally visible.

9. A lighting device for a moving body, the lighting device comprising:
a sensor that senses one or more objects located in at least one direction of the moving body and outputs object information related to the sensed one or more objects;
a light output device including at least one lamp; and
a controller configured to:
control the light output device based on the object information;
control the light output device such that, based on information on a location of an object, among the one or more objects, included in the object information, the at least one lamp emits light along a movement path of the object;
store the object information;
learn features of the one or more objects; and
control the light output device such that second marks representing features of the one or more objects are displayed through learned data,
wherein the light output device displays an image corresponding to the object.

10. The lighting device of claim 9, wherein the controller is further configured to:
set safety priorities according to the features of the one or more objects; and
control the light output device such that the at least one lamp emits light along a movement path of an object among the one or more objects having a highest priority according to safety priorities.

11. The lighting device of claim 9, wherein each of the second marks includes at least one of a physical feature of the object, a feature of clothes worn by the object, a feature of whether an animal is accompanied, or any combination thereof.

12. A method of controlling a lighting device of a moving body, the method comprising:
sensing, by a sensor, one or more objects located in at least one direction of the moving body and outputting object information related to the sensed one or more objects;
controlling a light output device based on the object information;
controlling the light output device such that, based on information on a location of an object, among the one or more objects, included in the object information, the light output device emits light along a movement path of the object; and
controlling the light output device such that a number of objects included in the object information is displayed,
wherein the light output device displays an image corresponding to the object.

13. The method of claim 12, further comprising:
controlling the light output device such that the lighting device is oriented to an area where a density of the one or more objects is highest within a region sensed by the sensor.

14. The method of claim 12, further comprising:
storing the object information;
learning features of the one or more objects; and
controlling the light output device such that second marks representing the features of the one or more objects are displayed through learned data.

* * * * *